(12) United States Patent
Djugash et al.

(10) Patent No.: US 10,395,555 B2
(45) Date of Patent: Aug. 27, 2019

(54) SYSTEM AND METHOD FOR PROVIDING OPTIMAL BRAILLE OUTPUT BASED ON SPOKEN AND SIGN LANGUAGE

(71) Applicant: Toyota Motor Engineering & Manufacturing North America, Inc., Erlanger, KY (US)

(72) Inventors: Joseph M. A. Djugash, San Jose, CA (US); Rajiv Dayal, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 86 days.

(21) Appl. No.: 14/673,303

(22) Filed: Mar. 30, 2015

(65) Prior Publication Data
US 2016/0293051 A1 Oct. 6, 2016

(51) Int. Cl.
*G09B 21/02* (2006.01)
*G09B 21/00* (2006.01)

(52) U.S. Cl.
CPC ........... *G09B 21/02* (2013.01); *G09B 21/006* (2013.01); *G09B 21/009* (2013.01)

(58) Field of Classification Search
CPC .. G09B 21/001; G09B 21/003; G09B 21/004; G09B 21/02; G09B 21/025; G06F 3/016; G06K 9/00355; B41J 3/32
See application file for complete search history.

(56) References Cited

U.S. PATENT DOCUMENTS 4,307,266 A    12/1981   Messina
4,520,501 A *   5/1985   DuBrucq ............. G09B 21/009
                                                           340/407.2
(Continued)

FOREIGN PATENT DOCUMENTS

CN       201440733 U   *   4/2010
CN       202601031        12/2012
(Continued)

OTHER PUBLICATIONS

Wu et al, "Fusing Multi-modal Features for Gesture Recognition", Proceedings of the 15th ACM on International conference on multimodal interaction, Dec. 9, 2013, ACM, p. 453-459.*
(Continued)

*Primary Examiner* — Eddy Saint-Vil
*Assistant Examiner* — William D Ermlick
(74) *Attorney, Agent, or Firm* — Snell & Wilmer LLP (57) ABSTRACT

A system for determining output text based on spoken language and sign language includes a camera configured to detect image data corresponding to a word in sign language. The system also includes a microphone configured to detect audio data corresponding to the word in spoken language. The system also includes a processor configured to receive the image data from the camera and convert the image data into an image based text word. The processor is also configured to receive the audio data from the microphone and convert the audio data into an audio based text word. The processor is also configured to determine an optimal word by selecting one of the image based text word or the audio based text word based on a comparison of the image based text word and the audio based text word.

19 Claims, 6 Drawing Sheets

(56) References Cited

U.S. PATENT DOCUMENTS

| | | | |
|---|---|---|---|
| 5,047,952 A * | 9/1991 | Kramer | A61B 5/6806 341/20 |
| 5,539,665 A | 7/1996 | Lamming et al. | |
| 5,544,050 A * | 8/1996 | Abe | G09B 21/009 704/1 |
| 5,636,038 A * | 6/1997 | Lynt | A61F 9/08 340/4.12 |
| 5,659,764 A * | 8/1997 | Sakiyama | G09B 21/009 340/4.13 |
| 5,953,693 A * | 9/1999 | Sakiyama | G06F 3/017 340/4.13 |
| 6,230,135 B1 * | 5/2001 | Ramsay | G09B 21/001 704/271 |
| 6,272,462 B1 * | 8/2001 | Nguyen | G10L 15/075 704/243 |
| 6,273,726 B1 | 8/2001 | Kirksey et al. | |
| 6,334,102 B1 * | 12/2001 | Lewis | G10L 15/197 704/255 |
| 6,477,239 B1 * | 11/2002 | Ohki | G09B 21/009 348/14.01 |
| 6,542,623 B1 * | 4/2003 | Kahn | G09B 21/025 382/114 |
| 6,556,970 B1 * | 4/2003 | Sasaki | G01C 21/3608 382/100 |
| 6,701,296 B1 * | 3/2004 | Kramer | A61B 5/6806 370/545 |
| 6,839,667 B2 * | 1/2005 | Reich | G10L 15/22 704/239 |
| 6,898,567 B2 * | 5/2005 | Balasuriya | G10L 15/30 704/231 |
| 7,069,215 B1 * | 6/2006 | Bangalore | G06K 9/00355 382/187 |
| 7,228,275 B1 * | 6/2007 | Endo | G10L 15/32 704/231 |
| 7,446,669 B2 | 11/2008 | Libermann | |
| 7,463,188 B1 | 12/2008 | McBurney | |
| 7,565,295 B1 * | 7/2009 | Hernandez-Rebollar | G06K 9/00355 382/182 |
| 7,607,097 B2 | 10/2009 | Janakiraman et al. | |
| 7,983,910 B2 * | 7/2011 | Subramanian | G10L 19/0018 704/250 |
| 8,005,263 B2 * | 8/2011 | Fujimura | G06F 3/017 379/52 |
| 8,325,883 B2 | 12/2012 | Schultz et al. | |
| 8,335,688 B2 * | 12/2012 | Yegnanarayanan | G10L 15/063 704/235 |
| 8,412,521 B2 * | 4/2013 | Mathias | G10L 15/063 704/235 |
| 8,428,643 B2 * | 4/2013 | Lin | G06F 3/017 379/52 |
| 8,494,847 B2 * | 7/2013 | Emori | G10L 15/08 704/231 |
| 8,494,859 B2 * | 7/2013 | Said | G06F 17/218 704/270 |
| 8,538,688 B2 | 9/2013 | Prehofer | |
| 8,571,860 B2 * | 10/2013 | Strope | G10L 15/32 704/231 |
| 8,606,316 B2 | 12/2013 | Evanitsky | |
| 8,797,386 B2 | 8/2014 | Chou et al. | |
| 8,836,580 B2 | 9/2014 | Mendelson | |
| 8,909,534 B1 * | 12/2014 | Heath | G10L 15/06 704/243 |
| 8,930,458 B2 | 1/2015 | Lewis | |
| 8,994,498 B2 | 3/2015 | Agrafioti | |
| 9,025,016 B2 | 5/2015 | Wexler et al. | |
| 9,037,463 B2 * | 5/2015 | Willett | G10L 15/142 704/254 |
| 9,053,094 B2 * | 6/2015 | Yassa | G06F 17/2854 |
| 9,076,450 B1 * | 7/2015 | Sadek | G10L 15/34 |
| 9,081,079 B2 | 7/2015 | Chao et al. | |
| 9,111,545 B2 * | 8/2015 | Jadhav | H04M 1/72547 |
| 9,137,639 B2 | 9/2015 | Garin et al. | |
| 9,153,231 B1 * | 10/2015 | Salvador | G10L 15/065 |
| 9,190,058 B2 * | 11/2015 | Klein | G06F 3/167 |
| 9,267,801 B2 | 2/2016 | Gupta et al. | |
| 9,280,969 B2 * | 3/2016 | Li | G10L 15/063 |
| 9,335,175 B2 | 5/2016 | Zhang et al. | |
| 9,552,817 B2 * | 1/2017 | Chang | G10L 19/005 |
| 9,774,747 B2 * | 9/2017 | Garland | H04M 11/10 |
| 10,089,977 B2 * | 10/2018 | Ganapathy | G10L 15/32 |
| 10,147,428 B1 * | 12/2018 | Shastry | G10L 15/26 |
| 2002/0178344 A1 * | 11/2002 | Bourguet | G06K 9/00335 712/1 |
| 2003/0133085 A1 | 7/2003 | Tretiakoff | |
| 2004/0056907 A1 * | 3/2004 | Sharma | G10L 15/24 715/863 |
| 2004/0138885 A1 * | 7/2004 | Lin | G10L 15/32 704/240 |
| 2005/0221260 A1 | 10/2005 | Kikuchi | |
| 2005/0283752 A1 * | 12/2005 | Fruchter | G06F 17/3079 717/100 |
| 2006/0069558 A1 * | 3/2006 | Beattie | G09B 5/06 704/235 |
| 2008/0145822 A1 * | 6/2008 | Bucchieri | G09B 21/003 434/114 |
| 2008/0162132 A1 * | 7/2008 | Doulton | G10L 15/265 704/235 |
| 2008/0260210 A1 | 10/2008 | Kobeli | |
| 2009/0012788 A1 * | 1/2009 | Gilbert | G10L 21/06 704/235 |
| 2009/0018833 A1 * | 1/2009 | Kozat | G10L 15/32 704/257 |
| 2009/0040215 A1 * | 2/2009 | Afzulpurkar | G06K 9/00355 345/419 |
| 2009/0106016 A1 | 4/2009 | Athsani | |
| 2009/0138265 A1 * | 5/2009 | Willett | G10L 15/063 704/251 |
| 2009/0210596 A1 | 8/2009 | Furuya | |
| 2010/0004930 A1 * | 1/2010 | Strope | G10L 15/32 704/240 |
| 2010/0121638 A1 * | 5/2010 | Pinson | G10L 15/02 704/235 |
| 2010/0179452 A1 | 7/2010 | Srinivasan | |
| 2010/0250250 A1 * | 9/2010 | Wiggs | G10L 15/32 704/235 |
| 2011/0071830 A1 * | 3/2011 | Kim | G01C 21/3602 704/246 |
| 2011/0246064 A1 | 10/2011 | Nicholson | |
| 2012/0327194 A1 | 12/2012 | Shiratori | |
| 2013/0038521 A1 | 2/2013 | Sugaya et al. | |
| 2013/0079061 A1 * | 3/2013 | Jadhav | H04M 1/72547 455/563 |
| 2013/0115578 A1 * | 5/2013 | Shiina | G09B 21/009 434/112 |
| 2013/0144616 A1 * | 6/2013 | Bangalore | G10L 15/1822 704/226 |
| 2013/0144629 A1 * | 6/2013 | Johnston | G06F 3/167 704/275 |
| 2013/0201344 A1 | 8/2013 | Sweet, III | |
| 2013/0204605 A1 * | 8/2013 | Illgner-Fehns | G09B 21/009 704/2 |
| 2013/0243250 A1 | 9/2013 | France | |
| 2013/0265450 A1 | 10/2013 | Barnes, Jr. | |
| 2013/0290909 A1 | 10/2013 | Gray | |
| 2013/0311179 A1 | 11/2013 | Wagner | |
| 2014/0133290 A1 | 5/2014 | Yokoo | |
| 2014/0236932 A1 | 8/2014 | Ikonomov | |
| 2014/0281943 A1 | 9/2014 | Prilepov | |
| 2014/0287382 A1 | 9/2014 | Villar Cloquell | |
| 2014/0309806 A1 | 10/2014 | Ricci | |
| 2014/0335893 A1 | 11/2014 | Ronen | |
| 2014/0343846 A1 | 11/2014 | Goldman et al. | |
| 2014/0347265 A1 | 11/2014 | Aimone | |
| 2015/0063661 A1 | 3/2015 | Lee | |
| 2015/0081884 A1 | 3/2015 | Maguire | |
| 2015/0099946 A1 | 4/2015 | Sahin | |
| 2015/0120186 A1 | 4/2015 | Heikes | |
| 2015/0135310 A1 | 5/2015 | Lee | |

(56) References Cited

U.S. PATENT DOCUMENTS

| | | | |
|---|---|---|---|
| 2015/0141085 A1 | 5/2015 | Nuovo et al. | |
| 2015/0125831 A1 | 7/2015 | Chandrashekhar Nair et al. | |
| 2015/0219757 A1 | 8/2015 | Boelter et al. | |
| 2015/0223355 A1 | 8/2015 | Fleck | |
| 2015/0256977 A1 | 9/2015 | Huang | |
| 2015/0262509 A1* | 9/2015 | Labbe | G09B 21/004 434/113 |
| 2015/0279172 A1 | 10/2015 | Hyde | |
| 2015/0279360 A1* | 10/2015 | Mengibar | G10L 15/18 704/257 |
| 2015/0367176 A1 | 12/2015 | Bejestan | |
| 2016/0007158 A1 | 1/2016 | Venkatraman | |
| 2016/0028917 A1 | 1/2016 | Wexler | |
| 2016/0042228 A1* | 2/2016 | Opalka | G06F 3/01 382/103 |
| 2016/0078289 A1* | 3/2016 | Michel | G06T 7/73 345/156 |
| 2016/0098138 A1 | 4/2016 | Park | |
| 2016/0198319 A1 | 7/2016 | Huang | |
| 2017/0278508 A1* | 9/2017 | Kurata | G10L 15/26 |

FOREIGN PATENT DOCUMENTS

| | | |
|---|---|---|
| EP | 2751775 | 7/2016 |
| GB | 2369219 | 5/2002 |
| GB | 2401752 | 11/2004 |
| JP | 4727352 | 7/2011 |
| WO | WO 9949656 | 9/1999 |
| WO | WO 2008015375 | 2/2008 |
| WO | WO 2015065418 | 5/2015 |
| WO | WO 2015108882 | 7/2015 |

OTHER PUBLICATIONS

Pitsikalis et al, "Multimodal Gesture Recognition via Multiple Hypotheses Rescoring", Journal of Machine Learning Research, Feb. 2015, p. 255-284.*

Machine Translation of Gong (CN 201440733) from https://worldwide.espacenet.com.*

Harklin; Apr. 5, 2013; "Senator Harkin Delivers Floor Speech in American Sign Language Upon Passage of the ADA"; https://www.youtube.com/watch?v=BomPo6fPOOo.*

Nabiyev, Vasif et al.; "Intelligent Communication Between Hearing Disabled People and Visual Disabled People"; Karadeniz Technical University; 4 pages; Jan. 2008.

Motlhabi, Michael B.; "A Limited Communication Domain Mobile Aid for a Deaf Patient at the Pharmacy"; Univers of the Western Cape; 29 pages; Jun. 5, 2012.

Khambadkar, Vinitha et al.; "A Tactile-Proprioceptive Communication Aid for Users Who Are Deafblind"; IEEE Haptics Symposium 2014; pp. 239-245; Feb. 23, 2014.

Jayant, Chandrika et al.; "VBraille: Haptic Braille Perception Using a Touch-Screen and Vibration on Mobile Phones"; Assets' 10; pp. 295-296; Oct. 25, 2010.

Su, Mu-Chun et al.; "A Portable Communication Aid for Deaf-Blind People"; Computing & Control Engineering Journal; vol. 12, No. 1; 20 pages; Feb. 2001.

Radha, H G et al.; "Design and Development of an Assistive Device for Speech and Hearing Impaired"; IJITR; vol. 2, No. 2; pp. 859-862; Feb. 2014.

Shen et al. "Walkie-Markie: Indoor Pathway Mapping Made Easy" 10th USENIX Symposium on Networked Systems Design and Implementation (NSDI'13); pp. 85-98, 2013.

Tu et al. "Crowdsourced Routing II D2.6" 34 pages; 2012.

De Choudhury et al. "Automatic Construction of Travel Itineraries Using Social Breadcrumbs" pp. 35-44; Jun. 2010.

* cited by examiner

SYSTEM AND METHOD FOR PROVIDING OPTIMAL BRAILLE OUTPUT BASED ON SPOKEN AND SIGN LANGUAGE

BACKGROUND

1. Field

The present disclosure relates to a system and a method for providing braille output and, more particularly, to a system and a method for providing braille output based on detected audio data corresponding to spoken language and detected image data corresponding to sign language.

2. Description of the Related Art

In speeches, a presenter typically speaks regarding one or more topics. Most individuals in attendance will be capable of hearing the spoken language and thus capable of receiving the content of the speech. During some speeches, such as high profile speeches, a sign language interpreter may be present. The sign language interpreter may be tasked with repeating the words or content of the speech using sign language so that hearing-disabled individuals are capable of receiving the content of the speech as well. In that regard, the content of the speech is provided via the spoken language and the sign language.

However, this system of using a sign language interpreter to convert the spoken language into sign language does not provide for individuals that are both hearing-impaired and vision-impaired. Accordingly, these individuals can only hope that, sometime in the future, the information presented by the speaker will be printed in braille so that they can receive the content. Even if and when the information is later printed in braille, the individual who prints the information in braille may skip portions of the content, may not remember all of the details of the content, may misrepresent some of the details of the content, or the like. As such, the printed braille information may not be complete or accurate and the hearing and vision impaired individual may still not receive all of the information provided in the presentation.

Thus, there is a need for systems and methods for providing optimal braille output based on spoken and sign language.

SUMMARY

What is described is a system for determining output text based on spoken language and sign language. The system includes a camera configured to detect image data corresponding to a word in sign language. The system also includes a microphone configured to detect audio data corresponding to the word in spoken language. The system also includes a processor configured to receive the image data from the camera and convert the image data into an image based text word. The processor is also configured to receive the audio data from the microphone and convert the audio data into an audio based text word. The processor is also configured to determine an optimal word by selecting one of the image based text word or the audio based text word based on a comparison of the image based text word and the audio based text word.

Also described is a method for determining output text based on spoken language and sign language. The method includes detecting, by a camera, image data corresponding to a word in sign language. The method also includes detecting, by a microphone, audio data corresponding to the word in spoken language. The method also includes comparing, by a processor, the image data to stored image data to determine an image based text word. The method also includes comparing, by the processor, the audio data to stored audio data to determine an audio based text word. The method also includes determining, by the processor, an optimal word by selecting one of the image based text word or the audio based text word based on a comparison of the image based text word and the audio based text word.

Also described is a system for determining output text based on spoken language and sign language. The system includes a camera configured to detect image data corresponding to a word in sign language. The system also includes a microphone configured to detect audio data corresponding to the word in spoken language. The system also includes a processor configured to receive the image data from the camera and convert the image data into an image based text word. The processor is also configured to receive the audio data from the microphone and convert the audio data into an audio based text word. The processor is also configured to determine an image confidence value of the image based text word. The processor is also configured to determine an audio confidence value of the audio based text word. The processor is also configured to determine an optimal word by selecting one of the image based text word or the audio based text word based on a comparison of the image confidence value and the audio confidence value.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Disclosed herein are systems and methods for providing optimal braille output based on spoken and sign language. The systems and methods provide several benefits and advantages such as the capability of converting detected audio data corresponding to spoken language into text and converting detected image data corresponding to sign language into text. The capability of converting both audio and video data into text provides benefits and advantages such as the ability of the systems and methods to determine text data when only one of spoken language or sign language is present and the ability of the systems and methods to determine an optimal text stream based on the audio based text and the image based text. The capability of determining an optimal text stream is advantageous because if the quality of the detected audio or the detected video is poor (such as the system being positioned far from the sign language interpreter) or the quality of the sign language or the spoken language makes it tough to convert to text (such as a speaker having a strong accent), an accurate text stream can still be determined and provided to a user. The systems and methods provide further benefits and advantages such as being capable of assigning confidence values to each spoken and/or signed word such that the word having the highest confidence value can be selected and output, further increasing the accuracy of the output text stream. The systems and methods provide additional benefits and advantages such as converting the spoken and/or sign language to braille in nearly real time so that a user can receive information nearly simultaneously with the spoken language and the sign language.

An exemplary system includes a microphone for detecting audio data that corresponds to spoken language words. The system also includes one or more cameras for detecting an image that corresponds to sign language. The system also includes a memory for storing image data corresponding to signed words and audio data corresponding to spoken words. The system also includes a processor for comparing the detected image data to the stored image data to determine text corresponding to the sign language and for comparing the detected audio data to the stored audio data to determine text corresponding to the spoken language. The processor can also determine confidence values of each converted signed and spoken word and use the confidence values, the image based text and the audio based text to determine an optimal text stream to output. The system may also include a refreshable braille display for outputting the optimal text stream in braille format.

Figure 1:
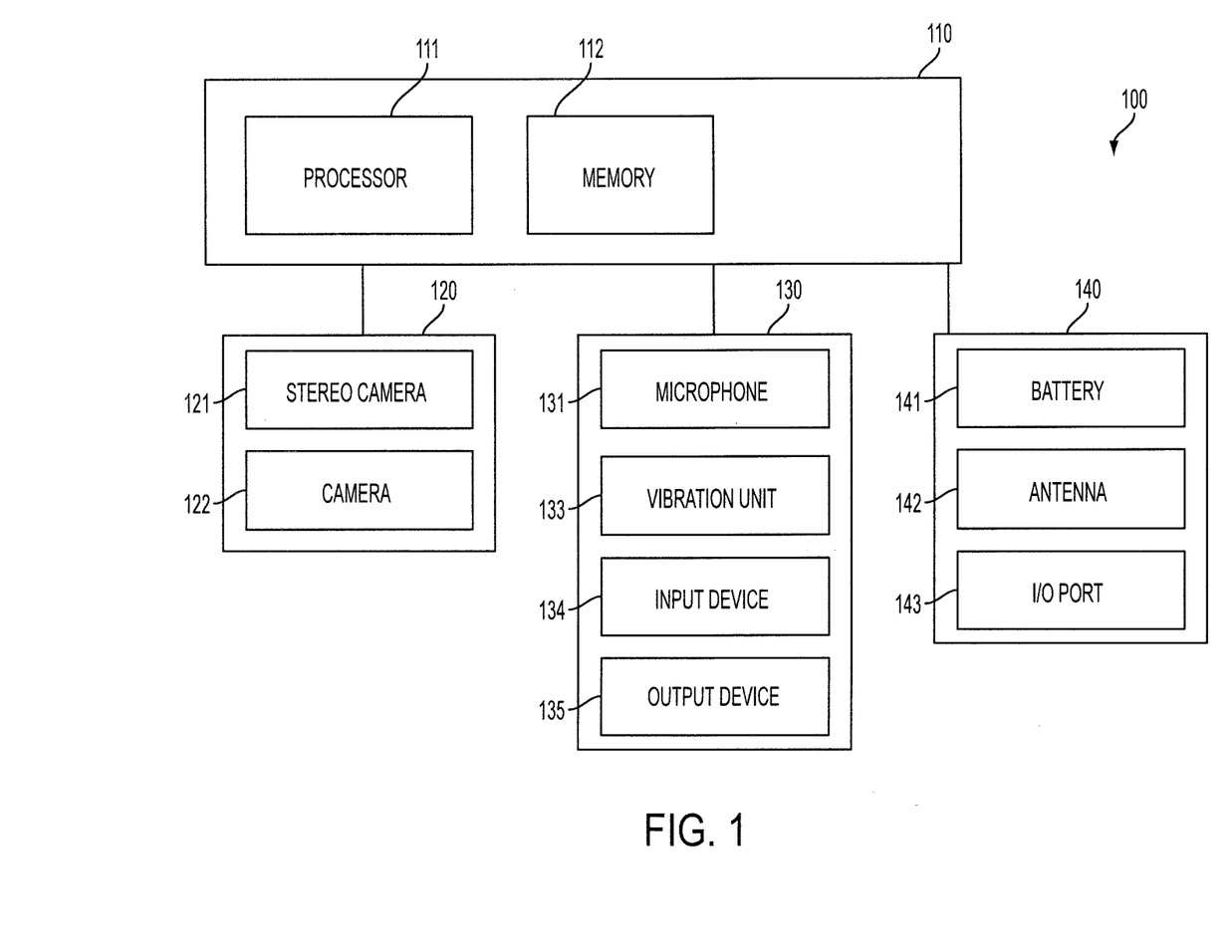
FIG. 1 is a block diagram of a braille optimization system capable of converting audio data and image data into braille data according to an embodiment of the present invention.

In one implementation and with reference to FIG. 1, a braille optimization system 100 includes an onboard processing array 110 which communicates with a sensor array 120, an interface array 130 and a component array 140. The onboard processing array 110, the sensor array 120, the interface array 130 and the component array 140 are exemplary groupings to visually organize the components of the braille optimization system 100 in the block diagram of FIG. 1 and are not limiting or necessarily representative of any physical groupings. In addition, certain implementations may have more or less components than illustrated in FIG. 1 and components of the braille optimization system 100 may be distributed among two or more separate devices.

The onboard processing array 110 includes a processor 111 and a memory 112. The processor 111 may be a computer processor such as an ARM processor, DSP processor, distributed processor or other form of central processing. The processor 111 may be positioned on the braille optimization system 100, may be a remote processor or it may be a pairing of a local and a remote processor. In embodiments in which the components of the braille optimization system 100 are positioned on more than one device, each device may include a separate processor.

The memory 112 may be one or any combination of the following: a RAM or other volatile or nonvolatile memory, a non-transitory memory or a data storage device, such as a hard disk drive, a solid state disk drive, a hybrid disk drive or other appropriate data storage. The memory 112 may further store machine-readable instructions which may be loaded into the memory 112 and executed by the processor 111. As with the processor 111, the memory 112 may be positioned on the braille optimization system 100, may be positioned remote from the braille optimization system 100 or may be a pairing of a local and a remote memory and may include a separate memories for multiple devices.

The sensor array 120 includes stereo cameras 121 and a camera 122. The stereo cameras 121 may be a stereo camera pair comprising two cameras offset by a stereo distance. The camera 122 may be any sensor capable of detecting image data.

The interface array 130 includes a microphone 131, a vibration unit 133, an input device 134 and an output device 135. The microphone 131 may be a microphone or other device capable of detecting sounds, such as voice activation/commands or other voice actions from the user, and may be integrated with or external to the braille optimization system 100. The microphone 131 may also be capable of detecting audio data from sources other than the user such as words spoken by another individual. In that regard, the microphone 131 may also be considered a part of the sensor array 120. The vibration unit 133 may be one or more vibration motors or actuators capable of providing haptic and tactile output. In certain implementations, the vibration unit 133 may also be capable of producing sounds.

The input device 134 may be an input device such as a touch sensor, a plurality of buttons or the like. In various embodiments, the microphone 131 may be considered an input device, such that the term "input device" may refer to the microphone, a button or buttons, a touchpad, a touchscreen or the like.

The output device 135 may be capable of outputting data, such as image data or braille data. In that regard, the output device 135 may be positioned on the same device as the other components or may be placed on a remote device. For example, the output device 135 may include a refreshable braille surface (such as the refreshable braille display 300 of FIG. 3) that can output text in braille format.

The component array 140 includes a battery 141, an antenna 142, and an input/output port (I/O port) 143. The battery 141 may be a battery or other power supply capable of powering the braille optimization system 100. The antenna 142 may be one or more antennas capable of transmitting and receiving wireless communications. For example, the antenna 142 may be a Bluetooth or Wi-Fi antenna, a radio frequency identification (RFID) antenna or reader and/or a near field communication (NFC) unit. The I/O port 143 may be one or more ports for connecting additional peripherals. For example, the I/O port 143 may be a headphone jack, a data port or the like. The I/O port 143 may also be used in conjunction with the antenna 142 to communicate with remote devices.

At least a portion of the braille optimization system 100 may include one or more features allowing the braille optimization system 100 to be worn by a user. In some embodiments, the braille optimization system 100 may include a wearable smart device implemented as a necklace, an earpiece, eyeglasses, a smart watch, a smart clip or the like and include a refreshable braille surface separate from or integrated with the wearable portion of the braille optimization system 100. The necklace may drape over a user's neck or shoulders, eyeglasses may rest on a user's nose and/or ears, the smart watch may be worn around a user's neck or wrist, the smart clip may be clipped onto the user or an article of clothing of the user, etc. The wearable portion of the braille optimization system 100 may detect image and audio data and process the data. The refreshable braille surface may be placed on a support structure or held by the user such that the user can place at least one finger on the refreshable braille surface to detect the braille. In some embodiments, the output device may be included in the wearable portion or may be a separate wearable device. In some embodiments, the braille optimization system 100 may not include a wearable portion.

The braille optimization system 100 is capable of detecting audio data corresponding to spoken language and image data corresponding to sign language and correlating the audio data and the image data to generate an optimized output. The optimized output may be of a higher quality than an output generated solely based on the audio data or an output solely based on the image data. The braille optimization system 100 is also capable of outputting the optimized output in a braille form using a refreshable braille surface. This is particularly helpful for blind and deaf individuals who can neither hear spoken language nor see sign language. By providing these users an optimized output, they can be provided with the same quality of data as the individuals who can hear the spoken language and/or see the sign language.

In some embodiments, the braille optimization system 100 may not include an output device and may be utilized, for example, by a closed-captioning system. In that regard, during a widely-viewed presentation, a sign language interpreter may hear a presenter speak and repeat the words of the presenter using sign language. A television station may utilize a braille optimization system such as the braille optimization system 100 to generate optimized closed captioning text based on the presenter's spoken language and the interpreter's sign language.

Figure 2:
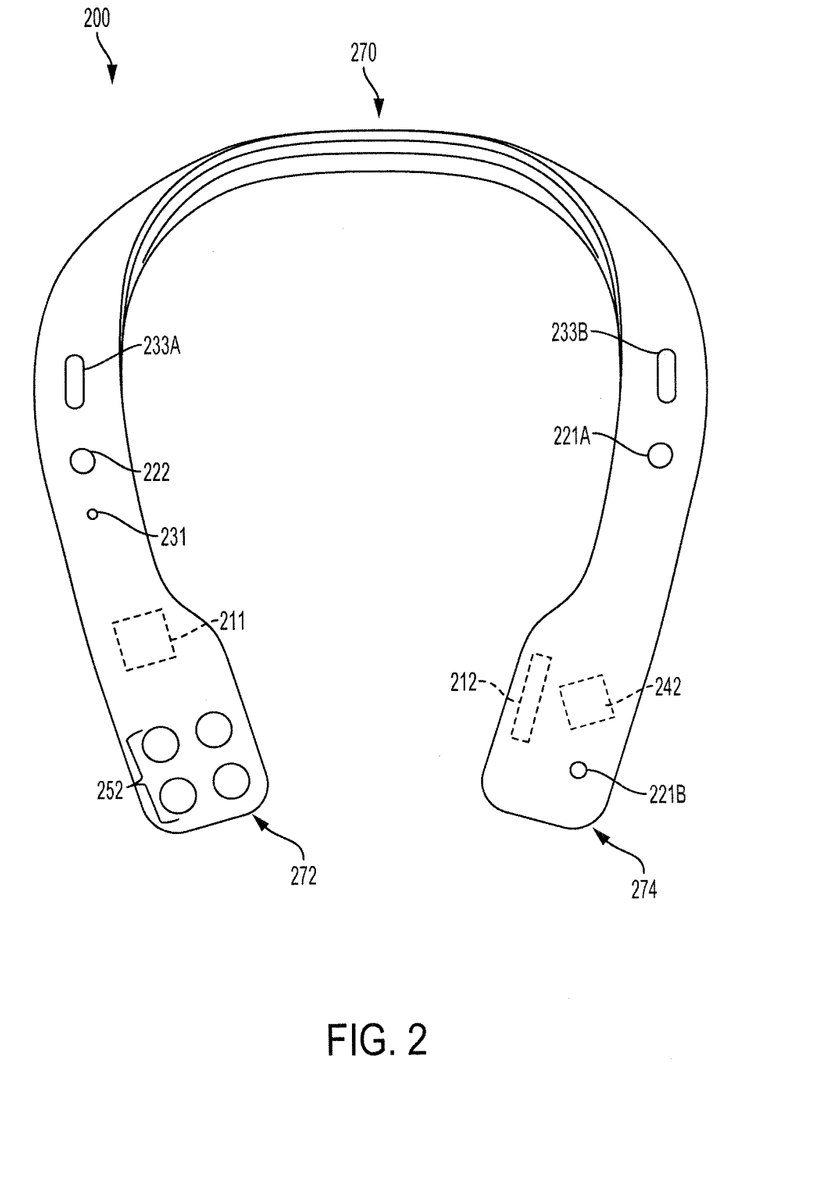
FIG. 2 illustrates a smart necklace as an embodiment of the braille optimization system of FIG. 1 according to an embodiment of the present invention.

With reference now to FIG. 2, a smart necklace 200 may include a processor 211, a memory 212, a first stereo camera 221A and a second stereo camera 221B forming a pair of stereo cameras 221, a camera 222, a microphone 231, a plurality of buttons 252, a first vibration unit 233A, a second vibration unit 233B and an antenna 242. The processor 211, the memory 212, the pair of stereo cameras 221, the camera 222, the microphone 231, the first vibration unit 233A, the second vibration unit 233B and the antenna 242 operate in a similar fashion as the corresponding components of the braille optimization system 100. In some embodiments, the first vibration unit 233A and/or the second vibration unit 233B may include or be replaced by speakers. The plurality of buttons 252 may function as an input device such that a mode of the smart necklace 200 may be selected based on a selection of one of the plurality of buttons 252.

The smart necklace 200 may be a wearable smart device and, as such, it may be worn by a user. In that regard, a top 270 of the smart necklace 200 may rest against the back of a user's neck while a first side 272 and a second side 274 drape across the user's shoulders and may rest on a front of the user's shoulders or a front of the user's chest.

Figure 3:
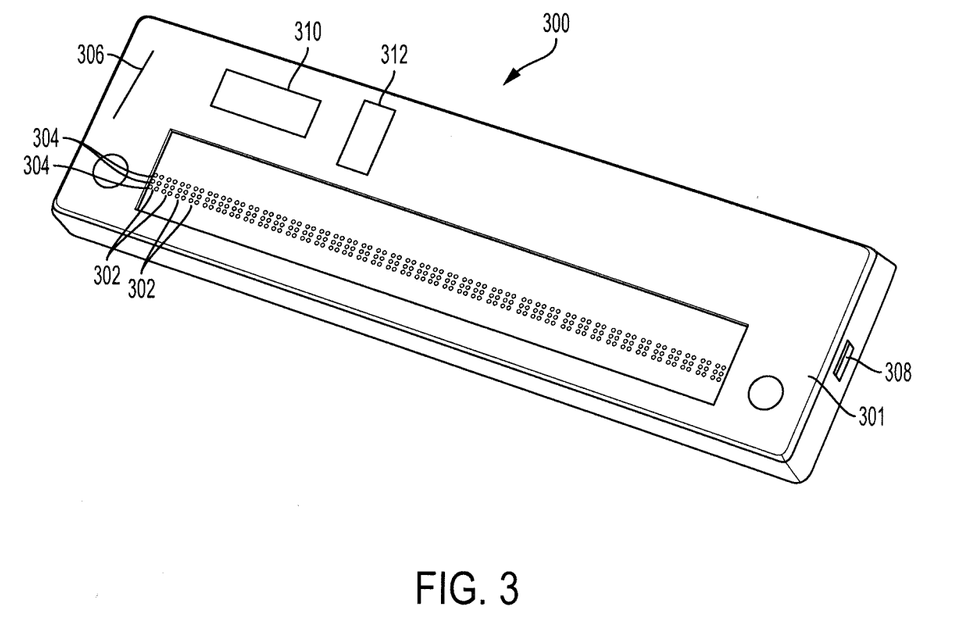
FIG. 3 illustrates a refreshable braille display capable of outputting data in braille according to an embodiment of the present invention.

With reference now to FIG. 3, a refreshable braille display 300 may include a body 301, a plurality of braille cells 302 each having six locations 304, a processor 310, a memory 312, a I/O port 308 and an antenna 306. Each of the plurality of braille cells 302 may correspond to a braille character. Each of the locations 304 of each of the plurality of braille cells 302 may include an aperture defined by the body 301 or another surface and a rod, pin or other body coupled to an actuator or a motor and capable of at least partially extending through the aperture. In that regard, each rod, pin or other body of each location for each of the plurality of braille cells 302 may be capable of extending through the aperture such that a braille character can be formed by extending the rod, pin or other body of particular locations that correspond to the braille character. A user may then touch the braille cell and feel the rods, pins or other bodies extending from the certain locations to read the character. After a predetermined time, number of characters or the like, at least some of the plurality of braille cells 302 may begin to be cleared and/or refreshed with new braille text.

The processor 310 may be capable of controlling the actuators of each of the locations 304 of each of the plurality of braille cells 302. In that regard, the processor 310 controls the braille text that is output by the refreshable braille display 300. The memory 312 may contain data and/or other instructions to be performed by the processor 310, text to be output at a later time or other storable information.

The I/O port 308 may be capable of being electrically coupled to another device, such as the smart necklace 200 of FIG. 2. In that regard, the processor 310 of the refreshable braille display 300 may communicate with a remote device via the I/O port 308.

With reference now to FIGS. 2 and 3, the antenna 306 may be capable of wirelessly communicating with the antenna 242 of the smart necklace 200. In that regard, the processor 211 of the smart necklace 200 may determine text to be output by the refreshable braille display 300. The processor 211 may then transmit the text via the antenna 242 of the smart necklace 200. The text may be received by the antenna 306 of the refreshable braille display 300, transmitted to the processor 310 and output by the plurality of braille cells 302. In some embodiments, the smart necklace 200 and the refreshable braille display 300 may communicate via a wired connection or a wireless connection.

With continued reference to FIGS. 2 and 3, the smart necklace 200 and the refreshable braille display 300 may operate in tandem in a similar manner as the braille optimization system 100. In some embodiments, the smart necklace 200 alone may be considered a braille output device, with the text being output by the vibration unit 233A, the vibration unit 233B, the antenna 242, an I/O port (not illustrated) or the like.

In many situations such as seminars, lectures and speeches, a presenter may speak regarding a particular topic. The microphone 231 of the smart necklace 200 may detect the audio data and transmit the audio data to the processor 211. A sign language interpreter may convert the spoken words into sign language. The pair of stereo cameras 221 and/or the camera 222 may detect the image data corresponding to the sign language and transmit the image data to the processor 211.

In some embodiments, the pair of stereo cameras 221 and/or the camera 222 may detect additional image data that does not correspond to the sign language. In these situations, the processor 211 may process all of the image data to determine whether sign language is being used. For example, the processor 211 may compare portions of the detected image data to known sign language words or letters in the memory 212. When a match is found, indicating the location of the interpreter, the processor 211 may instruct the pair of stereo cameras 221 and/or the camera 222 to focus towards the interpreter. In some embodiments, the processor 211 may, instead or in addition to focusing the pair of stereo cameras 221 and/or the camera 222, elect to process the portion of the image data containing the sign language.

The processor 211 may receive the detected audio data and the detected image data and convert each into a string of text, such that the detected audio data is converted into an audio based text stream and the detected image data is converted into an image based text stream. The term "stream" is used to illustrate that the conversions are performed near real-time (i.e., the conversions take place while the speaker is still speaking and the signer is still signing), and a stream may include one or more words and/or characters.

The processor 211 may compare the detected audio data to data stored in the memory 212 to determine if each portion of the audio data corresponds to a particular word or phrase. When a match is found, the processor 211 may select any matching words or phrases as part of the audio based text stream. Similarly, the processor 211 may compare the detected image data to data stored in the memory 212 to determine if each image or collection of images corresponds to a particular word or phrase. The processor 211 may also select any matching words or phrases as part of the image based text stream.

After converting the audio data and the image data into text data, the processor 211 may determine an optimal text word or string of text based on at least some of the audio based text and the image based text. In some embodiments, the optimal string of text may be based on confidence values of the audio data and the image data or other factors. In some embodiments, such as where no sign language or spoken language is present, the processor 211 may convert the available data (audio or video) into a text stream and assign the available text stream as the optimal text stream so that it will be output.

The processor 211 may then transmit the optimal text to the processor 310 of the refreshable braille display 300 via the antenna 242 and the antenna 306. The processor 310 may instruct the plurality of braille cells 302 to output the optimal text. In that regard, the smart necklace 200 and the refreshable braille display 300 may operate in tandem to convert spoken language and sign language into optimal text that may be output in braille and read by vision and/or hearing impaired individuals.

In some embodiments, the first vibration unit 233A and the second vibration unit 233B may provide haptic feedback in addition to the braille feedback provided by the refreshable braille display 300. For example, if a correction is made to the output text, one or more of the first vibration unit 233A or the second vibration unit 233B may vibrate, indicating that a correction to the output text is forthcoming.

Because the optimal text is based on both the detected audio data and the detected image data, the optimal text may be more accurate than text based on only one of the audio data or the image data. This increase in accuracy is achieved because the processor 211 can rate the quality of the audio data and the image data, compare the audio based text and the image based text and use the ratings and the comparison in order to more accurately reproduce the original text.

Figure 4:
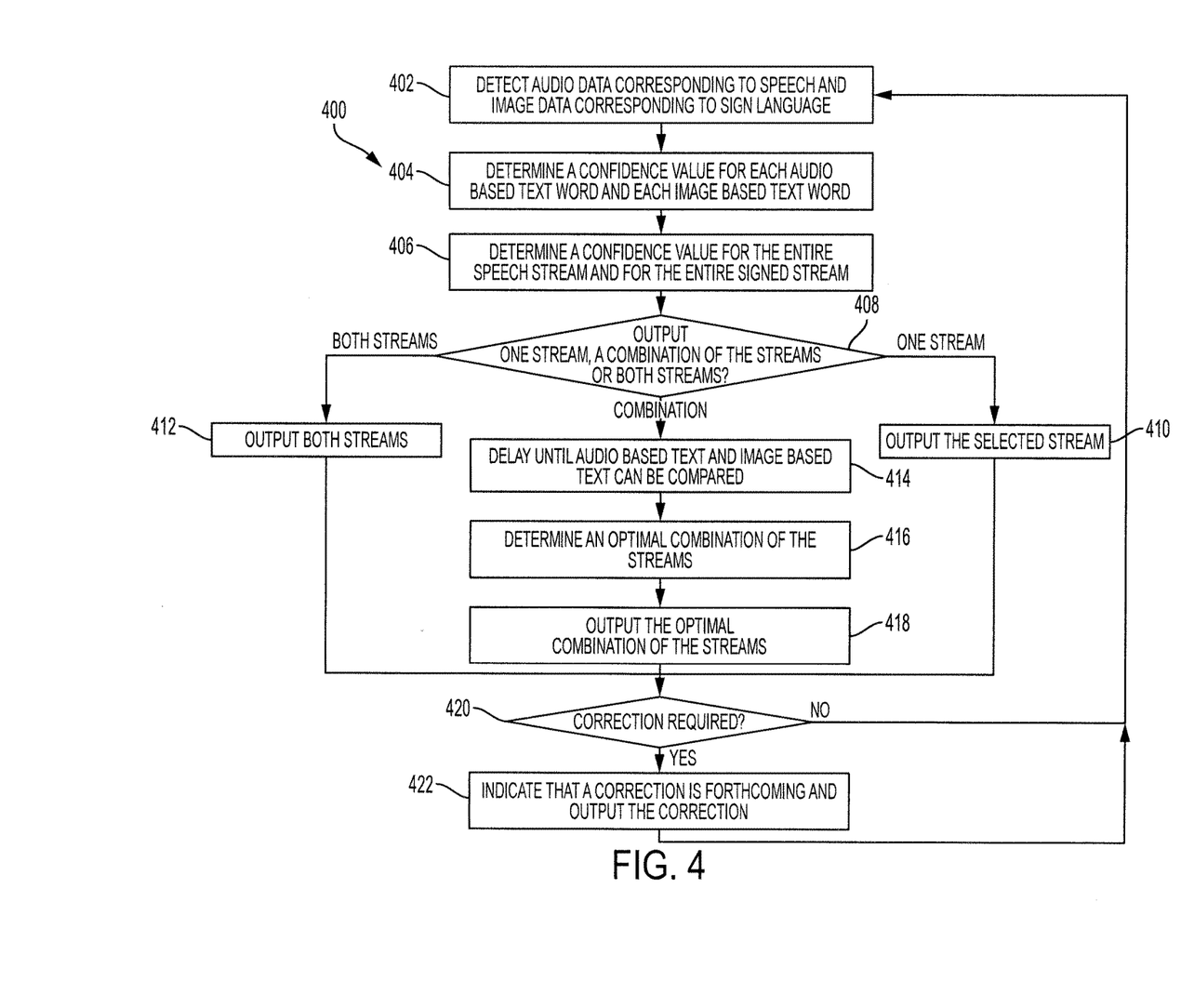
FIG. 4 illustrates a method for determining optimal braille output based on image data corresponding to sign language and audio data corresponding to spoken language according to an embodiment of the present invention.

With reference now to FIG. 4, a method 400 may be performed by a braille output device such as the braille optimization system 100 or the combination of the smart necklace 200 and the refreshable braille display 300.

In block 402, the braille optimization device may detect audio data corresponding to spoken words and image data corresponding to sign language. A processor may receive the detected audio data and the detected image data and translate each into text data. In that regard, the processor may determine a first text stream corresponding to the audio data (audio based text stream) and a second text stream corresponding to the image data (image based text stream). Each of the text streams may include one or more words, such that the audio based text stream may include a first audio based text word, a second audio based text word, etc., and the image based text stream may include a first image based text word, a second image based text word, etc.

In block 404, the processor may determine an audio confidence value for each audio based text word and a video confidence value for each image based text letter or word. Because sign language is sometimes spoken by signing letters instead of words, the image based text data can include words and/or letters. The confidence value for each word of the detected spoken language and the detected sign language may be based on a commonality of potential matches (i.e., how common each potential word is), a quality of the detected data and/or the how likely the word is to be used contextually. In some embodiments, other factors may be used for determining each of the confidence values.

Some words or phrases may be more commonly used than others. For example, the word thank is more common than the word tank. In that regard and based on the commonality of potential matches, if a potential word is "thank," the confidence value may be greater than if the potential word is "tank," because "thank" is more commonly used than "tank."

Sometimes, a speaker may mumble or may have a strong accent such that the conversion of the detected audio data to text may include more errors than if the speaker had no accent and does not mumble. Accordingly and based on quality of detected data, a confidence value for words spoken by a clear-speaking individual may be greater than a confidence value for a mumbling speaker. Similarly, some audio systems may generate higher quality audio than other audio systems such that data detected from a higher quality audio system may have a higher confidence value that data detected from lower-end audio systems.

Some words may make more sense in a context than other words. For example, if the text "thank you for" has already been determined, then a confidence value for the word "coming" may be greater than a confidence value for the word "running," based on context.

The commonality of potential matches factor and the context factor may be utilized in the same manner for determining a confidence value for image data as for determining a confidence value of the detected audio data. The quality of the detected image data corresponding to the sign language may vary. For example, image data corresponding to a nearby interpreter may correspond to a higher confidence value than image data corresponding to a far-away interpreter.

In block 406, the processor may determine a confidence value corresponding to the audio based text stream and a confidence value corresponding to the image based text stream. The confidence value of each stream may be determined based on the determined confidence values for each word or phrase of the stream and prior incorrect words of each stream. For example, if the average confidence value for each of the detected spoken words is lower than an average confidence value for each of the detected signed words, the confidence value for the audio based text stream may be lower than the confidence value for the image based text stream. Similarly, if the processor determines that 20% of the words in the audio based text stream have been incorrect and only 5% of the words in the image based text stream have been incorrect, then the image based text stream may be assigned a higher confidence value than the audio based text stream. The confidence value for each of the streams may be determined at periodic intervals, continuously, after each word or phrase has been converted or the like.

In block 408, the processor may determine whether to output one stream, a combination of the streams or both streams. In some situations, the braille optimization device may determine that it is preferable to output either the audio based text stream or the image based text stream based on factors such as the confidence value for each stream and the quality of detected data for each stream. The braille optimization device may also determine to output one of the text streams in other situations. For example, if the sign language is being provided using letters instead of words, the braille optimization device may determine to output only the image based text stream.

In some situations, a user may request to receive both text streams for a period of time. After the period of time, the user may determine that one of the text streams is more accurate than the other text stream. The user may then select to receive only the higher quality text stream. In some embodiments, the user may wish to receive both of the text streams for the length of the presentation to ensure that no information is missed.

In some situations, the braille optimization device may determine to output or the user may select to receive a combination of both of the text streams. This selection may result in a more accurate output text stream as a result of using two sources of information instead of one.

In block 410, if the braille optimization device is to output only one of the text streams, then the processor may convert and output the selected text stream, saving resources by not converting the other text stream. The selected stream may then be output by an output device such as the refreshable braille display 300 of FIG. 3.

In block 412, if the braille optimization device is to output both of the text streams, then the processor may generate both the audio based text stream and the image based text stream. The output device may then output each of the streams in a variety of manners. For example, the output device may output the first word of each stream and then the second word of each stream, it may output a predetermined amount of text from one of the text streams and then a predetermined amount of text from the other text stream or it may output text from the one of the text streams for a predetermined amount of time and then text from the other text stream for a predetermined amount of time.

If the braille optimization device determines that a combination of the audio based text stream and the image based text stream is to be output then the method 400 may proceed to block 414 wherein the method 400 may be delayed until the audio based text and the image based text have been determined.

Delays in the audio based text or the image based text may be caused by a number of factors. For example, in a situation in which a presenter is speaking and an interpreter is signing, the sign language may be delayed relative to the spoken language because the interpreter must hear the word prior to signing the word. As a result, the braille optimization device may not receive image data until a point in time after receiving the corresponding audio data. Additionally, conversion of audio data into text may be more process-intensive and thus take longer than conversion of image data into text, or vice versa. In order to compensate for these delays, the braille optimization device may delay until the corresponding word from each of the text audio based text stream and the image based text stream have been converted and can be compared.

The processor may utilize a number of factors to determine when to compare the audio based text and the image based text. The factors may include, for example, whether previous words of each text stream correspond to each other, whether a current word of each text stream corresponds to each other, whether a word of each text stream contextually fits based on previously-determined text, or the like.

In block 416, at a time when the audio based text and the image based text can be compared (i.e., corresponding words of each of the text streams have been determined), the processor may determine an optimal combination of the streams. The optimal combination of the streams may include one or more words from each of the text streams. For example, the optimal text stream may include a first word from the image based text stream, a second word from the audio based text stream, etc. The optimal combination may be based on a number of factors such as a correlation of each word of each stream, a confidence value of each word of each stream, the confidence value of each stream, whether each potential word fits contextually with previously determined text, whether the sign language is being provided in letters instead of words, or the like.

In some situations, the processor may determine that an optimal word can be determined for the output stream based on a correlation of the word from the audio based text stream and the image based text stream. For example, if the processor determines that a word from each of the text streams is the same, then the processor may determine that the word is the correct word to be output.

However, this may not always be the case. In many situations, corresponding words of the image based text stream and the audio based text stream (i.e., the third word of each text stream) may not match. In these situations, the processor may compare the confidence value of each word of each stream to determine if the word from one stream is more likely to be correct than the word from the other stream. For example, if the processor determines that the spoken word is "tanks" with 60% confidence and that the signed word is "thanks" with 90% confidence, then the processor may determine that "thanks" is more likely to be accurate than "tanks."

In a similar manner, the processor may determine an optimal word based on more than one potential word from each of the streams. For example, the processor may determine that "tanks" is the most likely potential word in the audio based text stream and "thanks" is the next most likely potential word. The processor may also determine that "thanks" is the most likely potential word of the image based text stream but "tanks" is only the fifth most likely potential word in the image based text stream. In this situation, the processor may determine that "thanks" is more likely to be accurate based on an average confidence value of each of the potential words, based on the position of each potential each word (i.e., a potential word ranked first and second would be more likely than a potential word ranked second and fifth) or the like.

Likewise, the processor may select an optimal word based on the confidence value of each of the text streams. For example, if the confidence value of the audio based text stream is 95% and the confidence value of the image based text stream is 50%, the processor may select the optimal word from the audio based text stream based on the higher confidence value of the audio based text stream, as it may be historically more likely to be accurate.

Context of the previously-determined words may also be a factor in the selection of each optimal word. For example, after the words "come on" have been determined to be the optimal words, the processor may determine that the most likely word in the audio based text stream is "in" and the most likely word in the image based text stream is "swim."

The processor may select "in" as the optimal word as it may be more likely to be correct based on the context of the words "come on."

As discussed above, the processor may also determine that a word from one of the text streams is more likely to be accurate than a word from the other text stream based on additional factors, such as whether the sign language is being signed using letters instead of words. One skilled in the art will realize that a system implementing a method similar to the method 400 may use any or all of the disclosed factors and, in some embodiments, may use additional factors not disclosed herein.

In block 418, the processor may instruct the output device to output the determined optimal combination of the streams.

In block 420, the processor may determine whether a correction to previously output text is required. For example, the processor may determine that a correction is required based on whether the previously-output word makes sense in context based on later determined words. In some embodiments, the processor may determine that a correction is required based on other factors. If no correction is required, then the method 400 returns to block 402 where audio data and image data continue to be collected and converted into their respective text streams.

In block 422, if the processor determined that a correction is required, then the processor may first indicate that a correction is forthcoming. The processor may cause the output device or another device, such as a vibration unit, to generate output data in the form of a vibration, a specific character or string of characters, or the like, indicating that the correction is forthcoming. After the forthcoming correction has been signaled, the processor may instruct the output device to output the correction. In some embodiments, the incorrect text may be cleared from the output device and the corrected text input in its place. In some embodiments, the output device may output all of the text beginning with the newly-corrected text or at a prior location than the newly-corrected text.

Figure 5:
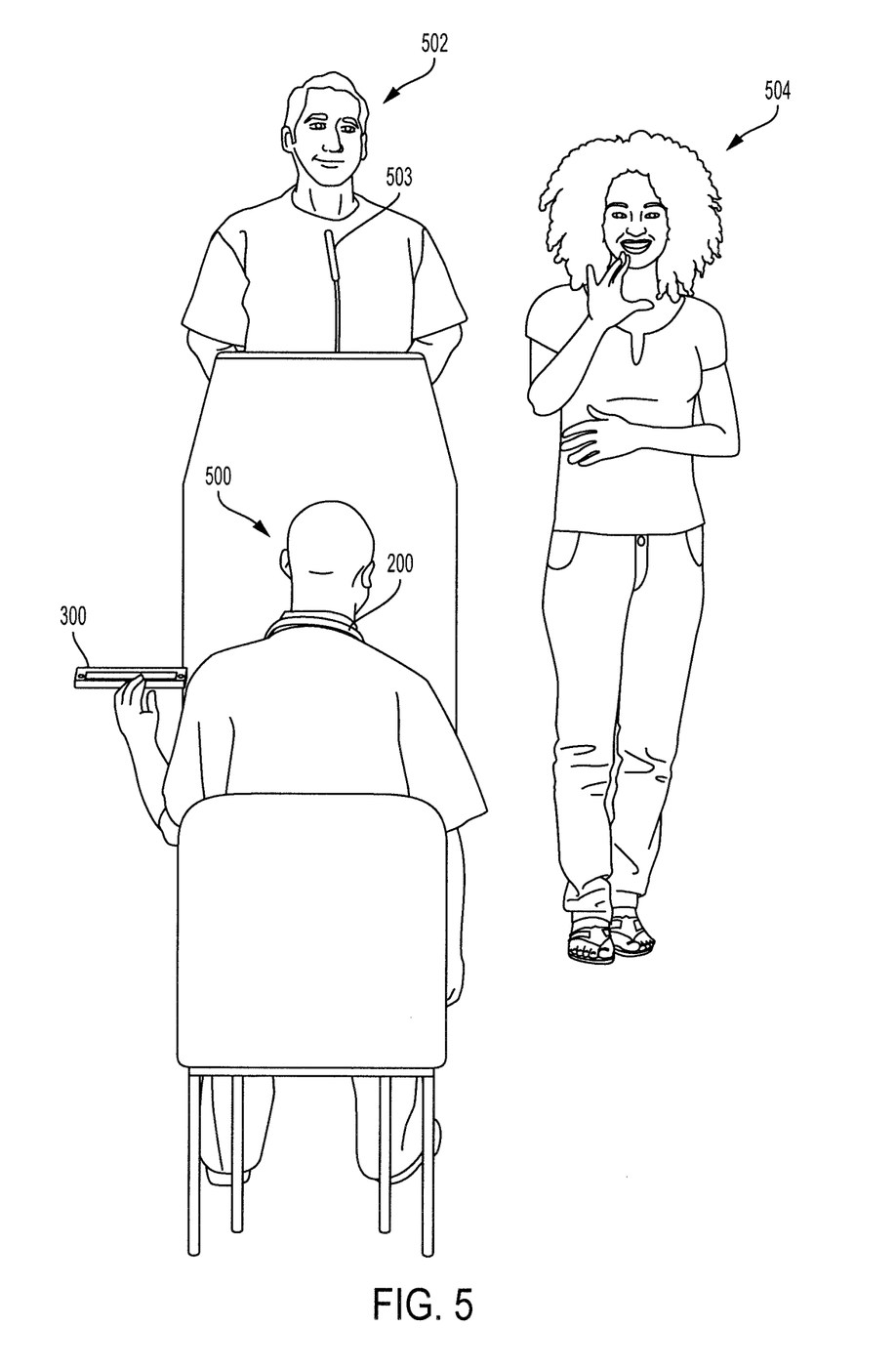
FIG. 5 illustrates an exemplary use of the smart necklace of FIG. 2 and the refreshable braille display of FIG. 3 according to an embodiment of the present invention.

With reference now to FIG. 5, a user 500 may be wearing the smart necklace 200 and using the refreshable braille display 300. The smart necklace 200 is implementing a method similar to the method 400 and the refreshable braille display 300 is functioning as an output device. The user 500 is at a location in which a presenter 502 is speaking into a microphone 503 and an interpreter 504 is providing a sign language interpretation of the spoken language of the presenter 502. The microphone 231 of the smart necklace 200 may detect audio data corresponding to the words spoken by the presenter 502. The stereo cameras 221 and/or the camera 222 may detect image data corresponding to the sign language of the interpreter 504.

Figure 6:
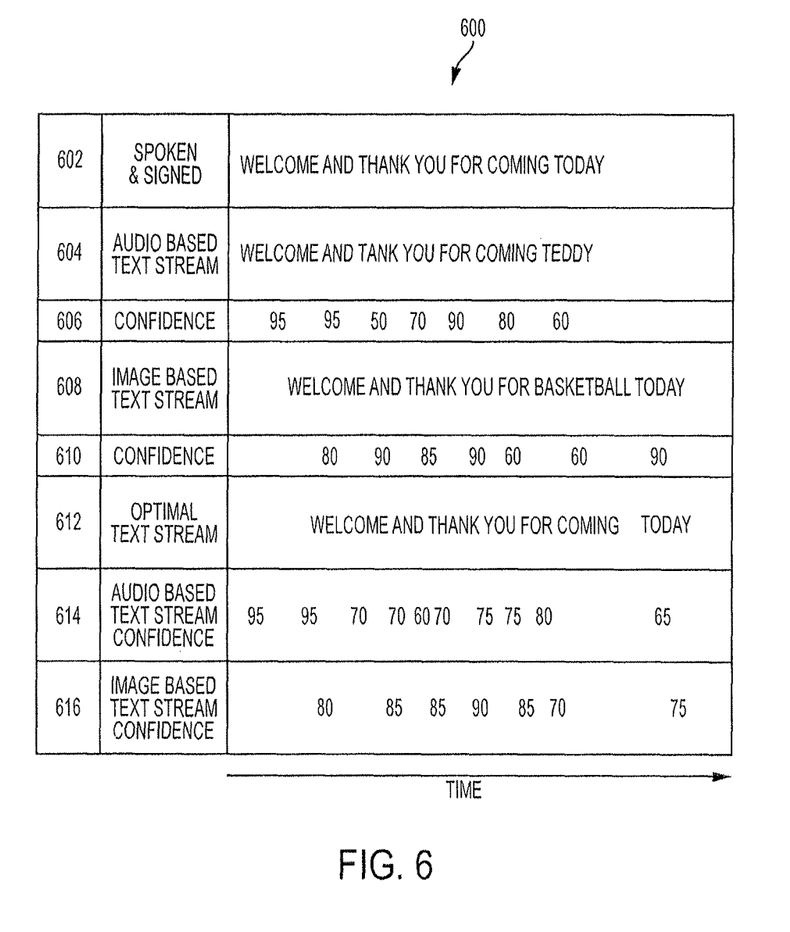
FIG. 6 continues the illustration of the exemplary use of FIG. 5 according to an embodiment of the present invention.

With reference now to FIGS. 5 and 6, the table 600 illustrates the words spoken by the presenter 502 and signed by the interpreter 504 in row 602. The processor 211 of the smart necklace 200 may convert the detected audio data into an audio based text stream, illustrated in row 604, and may convert the detected image data into an image based text stream, illustrated in row 608.

As the audio data and the image data are detected and converted to text data, the processor 211 may determine a confidence value for each word or phrase of each of the audio based text stream and the image based text stream. The confidence values may be based on the factors discussed above with reference to FIG. 4. The confidence value for each of the audio based words is illustrated in row 606 and the confidence value for each of the image based words is illustrated in row 610.

The processor 211 may also continuously or periodically determine a confidence value for the audio based text stream, illustrated in row 614, and a confidence value for the video stream, illustrated in row 616. The confidence values for each stream may be determined based on factors such as those discussed with reference to FIG. 4.

The spoken and signed language begins with the word "welcome" and then the word "and". The processor 211 may convert the first and second words into the text "welcome" and "and" based on the detected auto data. The processor 211 may also determine that both of these words have a confidence value of 95%. At a later point in time (i.e., after receiving the detected image data from the camera 222 and/or the pair of stereo cameras 221 that corresponds to the first and second word of the audio based text stream), the processor may convert the first and second words into the text "welcome" and "and" based on the detected image data. The processor 211 may also determine that "welcome" has a confidence value of 80% and "and" has a confidence value of 90%. The processor 211 may then select the optimal text, illustrated in row 612. The processor 211 may determine that the words "welcome" and "and" are the optimal first and second word based on the fact that the audio based text and the image based text both indicate the same two words.

Moving slightly backwards in time, the processor 211 has determined that the confidence value of the audio based text stream is 95% based on the confidence value of the first word "welcome" being 95%. Similarly, the processor 211 may determine that the confidence value of the audio based text stream is still 95% after the first word "welcome" has been selected as the optimal text and the second word "and" has been determined to have a confidence value of 95%. The confidence value of the video stream may initially be determined to be 80% based on the confidence value of the word "welcome" and the fact that "welcome" has been selected as the optimal text.

The next spoken and signed word is "thank". The processor 211 may convert the detected audio data into the word "tank" with a 50% confidence value. The processor 211 may also convert the image data into the word "thank" with a confidence value of 85%. The processor 211 may select the word "thank" as the optimal word, as shown in row 612, based on a number of factors such as the previously determined context and the confidence value of the audio based text as compared to the confidence value of the image based text.

The processor 211 has determined that the audio based text stream confidence value should be 70% after the word "tank" is allocated a confidence value of 50%. The confidence value of the audio based text stream may remain at 70% when the processor 211 determines that the confidence value for the word "you" is 70%. Once the processor 211 determines that the word "tank" is not selected, the confidence value of the audio based text stream is further changed to 60%.

As the processor 211 selects the optimal text, the processor 211 may instruct the refreshable braille display 300 to output the optimal text so that the user can receive the content of the presentation.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for determining text for an optimal text stream corresponding to a series of words presented in spoken language and sign language, the system comprising:
a camera configured to detect image data corresponding to the series of words in sign language;
a microphone configured to detect audio data corresponding to the series of words in spoken language; and
a processor configured to:
determine, for each word in the series of words in sign language, an image-based text word and a confidence value for the image-based text word based on the image data,
determine, for each word in the series of words in spoken language, an audio-based text word and a confidence value for the audio-based text word based on the audio data,
when a corresponding image-based text word and a corresponding audio-based text word do not match, for a particular word in the series of words:
select the image-based text word or the audio-based text word to be included in the optimal text stream based on an image stream confidence value and an audio stream confidence value, the image stream confidence value having an initial value corresponding to a confidence value of a first determined image-based text word, and the audio stream confidence value having an initial value corresponding to a confidence value of a first determined audio-based text word,
update the image stream confidence value by an amount proportional to a confidence value of the corresponding image-based text word and whether the corresponding image-based text word was selected, and
update the audio stream confidence value by an amount proportional to a confidence value of the corresponding audio-based text word and whether the corresponding audio-based text word was selected, and provide the optimal text stream to an output device.

2. The system of claim 1 wherein the confidence value for the audio-based text word is further based on at least one of a commonality of potential matches or a quality of the audio data.

3. The system of claim 1 further comprising a refreshable braille display configured to receive the optimal text stream and to output the optimal text stream in braille.

4. The system of claim 3 wherein the processor is further configured to determine that an optimal word of the optimal text stream that is incorrect and to determine a correct word, and wherein the refreshable braille display is further configured to output the correct word.

5. The system of claim 3 wherein the refreshable braille display is further configured to output the image-based text word and the audio-based text word.

6. The system of claim 1 wherein the processor is further configured to determine that the image-based text word is the same as the audio-based text word.

7. The system of claim 1 wherein the image data corresponds to sign language of each letter of the words.

8. The system of claim 1 wherein the image stream confidence value is updated by increasing the image stream confidence value when the confidence value of the corresponding image-based text word is greater than the image stream confidence value and by increasing the image stream confidence value when the corresponding image-based text word was selected, and
wherein the audio stream confidence value is updated by increasing the audio stream confidence value when the confidence value of the corresponding audio-based text word is greater than the audio stream confidence value and by increasing the audio stream confidence value when the corresponding audio-based text word was selected.

9. The system of claim 1 wherein the image stream confidence value is updated by decreasing the image stream confidence value when the confidence value of the corresponding image-based text word is less than the image stream confidence value and by decreasing the image stream confidence value when the corresponding image-based text word was not selected, and
wherein the audio stream confidence value is updated by decreasing the audio stream confidence value when the confidence value of the corresponding audio-based text word is less than the audio stream confidence value and by decreasing the audio stream confidence value when the corresponding audio-based text word was not selected.

10. A system for outputting text based on spoken language and sign language into an optimal text stream, the system comprising:
a camera configured to detect image data corresponding to words in sign language;
a microphone configured to detect audio data corresponding to the words in spoken language; and
a processor configured to:
receive the image data from the camera,
receive the audio data from the microphone,
convert the image data into multiple image-based text words and the audio data into multiple audio-based text words,
determine, for each word in the multiple image-based text words, an image confidence value based on the image data,
create an image stream confidence value having an initial value corresponding to a confidence value of a first image-based text word,
update the image stream confidence value by an amount proportional to a confidence value of each subsequent image-based text word of the multiple image-based text words and whether image-based text words were selected to form the optimal stream of words,
determine, for each word in the multiple audio-based text words, an audio confidence value based on the audio data,
create an audio stream confidence value having an initial value corresponding to a confidence value of a first audio-based text word,
update the audio stream confidence value by an amount proportional to a confidence value of each subsequent audio-based text word of the multiple audio-based text words and whether audio-based text words were selected to form the optimal stream of words,
select a combination of one or more image-based text words of the multiple image-based text words or one or more audio-based text words of the multiple audio-based text words to form the optimal stream of words based on the comparison of the image stream confidence value with the audio stream confidence value, and provide the optimal stream of words to an output device.

11. The system of claim 10 wherein the audio confidence value is further based on at least one of a commonality of potential matches or a quality of the audio data.

12. The system of claim 10 further comprising a refreshable braille display configured to receive the optimal text stream and to output the optimal text stream in braille.

13. The system of claim 12 wherein the processor is further configured to determine that an optimal word of the optimal text stream that is incorrect and to determine a correct word, and wherein the refreshable braille display is further configured to output the correct word.

14. The system of claim 12 wherein the refreshable braille display is further configured to output the image-based text word and the audio-based text word.

15. A method of determining text for an optimal text stream corresponding to a series of words presented in spoken language and sign language, the method comprising:

detecting, using a camera, image data corresponding to the series of words in sign language;

detecting, using a microphone, audio data corresponding to the series of words in spoken language;

determining, by a processor for each word in the series of words in sign language, an image-based text word and a confidence value for the image-based text word based on the image data;

determining, by the processor for each word in the series of words in spoken language, an audio-based text word and a confidence value for the audio-based text word based on the audio data;

for a particular word in the series of words, the particular word having a corresponding image-based text word and a corresponding audio-based text word;

selecting, by the processor, the image-based text word or the audio-based text word to be included in the optimal text stream based on an image stream confidence value and an audio stream confidence value, the image stream confidence value having an initial value corresponding to a confidence value of a first determined image-based text word, and the audio stream confidence value having an initial value corresponding to a confidence value of a first determined audio-based text word, updating, by the processor, the image stream confidence value by an amount proportional to a confidence value of the corresponding image-based text word and whether the corresponding image-based text word was selected, and updating, by the processor, the audio stream confidence value by an amount proportional to a confidence value of the corresponding audio-based text word and whether the corresponding audio-based text word was selected; and providing, by the processor, the optimal text stream to an output device as each word in the optimal text stream is selected.

16. The method of claim 15 wherein the confidence value for the audio-based text word is further based on at least one of a commonality of potential matches or a quality of the audio data.

17. The method of claim 15 further comprising outputting, by a refreshable braille display, the optimal text stream in braille.

18. The method of claim 15 further comprising outputting, by a refreshable braille display, the audio based text word and the image based text word.

19. The method of claim 15 further comprising determining, using the processor, that the image based text word is the same as the audio based text word.

* * * * *